(12) United States Patent
Shaalan et al.

(10) Patent No.: US 11,906,697 B2
(45) Date of Patent: Feb. 20, 2024

(54) METHOD AND SYSTEM FOR A MULTI-LEVEL NONLINEAR SOLVER FOR RESERVOIR SIMULATIONS

(71) Applicant: SAUDI ARABIAN OIL COMPANY, Dhahran (SA)

(72) Inventors: Tareq Shaalan, Dhahran (SA); Zhen Chen, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 407 days.

(21) Appl. No.: 17/193,639

(22) Filed: Mar. 5, 2021

(65) Prior Publication Data

US 2022/0283336 A1  Sep. 8, 2022

(51) Int. Cl.
*G01V 99/00* (2009.01)
*G06F 30/20* (2020.01)
(Continued)

(52) U.S. Cl.
CPC ............ *G01V 99/005* (2013.01); *G06F 30/20* (2020.01); *G06F 2111/04* (2020.01); *G06F 2111/10* (2020.01); *G06F 2113/08* (2020.01)

(58) Field of Classification Search
CPC .... G01V 99/005; G06F 30/20; G06F 2111/04
(Continued)

(56) References Cited

U.S. PATENT DOCUMENTS 6,052,520 A * 4/2000 Watts, III ............... G01V 11/00
703/2
8,805,660 B2 * 8/2014 Guyaguler ............ G06F 30/28
703/10
(Continued)

FOREIGN PATENT DOCUMENTS

CN 104866726 A 8/2015
WO 2011/066021 A1 6/2011
(Continued)

OTHER PUBLICATIONS

Thomas James Byer (Preconditioned Newton Methods for Simulation of Reservoirs With Surface Facilities, Stanford University, 2000, pp. 1-204) (Year: 2000).*
(Continued)

*Primary Examiner* — Iftekhar A Khan
(74) *Attorney, Agent, or Firm* — Osha Bergman Watanabe & Burton LLP

(57) ABSTRACT

A method may include obtaining grid model data for a geological region of interest and well data for various wells in the geological region of interest. A well among the wells may correspond to a simulated well network in a reservoir simulation. The method may further include determining, based on the grid model data and the well data, a first simulation solution for a first constraint rate equation decoupled from the simulated well network and using a first search method. The method may further include determining, based on the grid model data, the well data, and the first simulation solution, a second simulation solution for a second constraint rate equation coupled to the simulated well network and using a second search method. The method may further include performing, based on the grid model data, and the second simulation solution, the reservoir simulation.

16 Claims, 9 Drawing Sheets

(51) Int. Cl.
*G06F 111/04* (2020.01)
*G06F 113/08* (2020.01)
*G06F 111/10* (2020.01)

(58) Field of Classification Search
USPC .......................................................... 703/10
See application file for complete search history.

(56) References Cited

U.S. PATENT DOCUMENTS

| | | | |
|---|---|---|---|
| 10,175,386 B2 * | 1/2019 | Dogru | G01V 99/005 |
| 2006/0066021 A1 | 3/2006 | Sasahara | |
| 2006/0265203 A1 | 11/2006 | Jenny et al. | |
| 2006/0265204 A1 * | 11/2006 | Wallis | G06F 30/23 |
| | | | 703/10 |
| 2012/0158388 A1 * | 6/2012 | Rodgers | G05B 17/02 |
| | | | 703/10 |
| 2012/0203515 A1 * | 8/2012 | Pita | G06T 17/05 |
| | | | 703/2 |
| 2012/0232861 A1 * | 9/2012 | Lu | G01V 99/00 |
| | | | 703/2 |
| 2015/0066456 A1 * | 3/2015 | Shetty | G01V 99/005 |
| | | | 703/2 |
| 2015/0073763 A1 * | 3/2015 | Wang | G06Q 10/04 |
| | | | 703/10 |
| 2016/0070024 A1 * | 3/2016 | Berard | G01V 99/005 |
| | | | 703/10 |
| 2016/0259868 A1 * | 9/2016 | Wang | G01V 99/005 |
| 2016/0356125 A1 * | 12/2016 | Bello | G06Q 10/04 |
| 2018/0181693 A1 * | 6/2018 | Yang | G06F 30/20 |
| 2018/0230784 A1 * | 8/2018 | Rodriguez Herrera | |
| | | | G01V 1/288 |
| 2018/0355707 A1 * | 12/2018 | Rodriguez Herrera | |
| | | | E21B 43/26 |
| 2020/0226311 A1 * | 7/2020 | Ding | G01V 99/005 |
| 2021/0018637 A1 * | 1/2021 | Amin | G01V 1/282 |
| 2021/0182460 A1 * | 6/2021 | Yang | G06F 30/28 |
| 2021/0405249 A1 * | 12/2021 | Kayum | G06T 17/205 |
| 2022/0082719 A1 * | 3/2022 | Biniwale | G01V 99/005 |
| 2022/0082728 A1 * | 3/2022 | Crumpton | G06F 30/20 |
| 2022/0299676 A1 * | 9/2022 | Pecher | E21B 41/00 |

FOREIGN PATENT DOCUMENTS

| | | |
|---|---|---|
| WO | 2020150540 A1 | 7/2020 |
| WO | 2020229785 A1 | 11/2020 |

OTHER PUBLICATIONS

Kile et al. (Krylov-Secant Methods for Accelerating the Solution of Fully Implicit Formulations, 2005, SPE 92863, pp. 1-9) (Year: 2005).*

Younis et al. (Adaptively Localized Continuation-Newton Method—Nonlinear Solvers That Converge All the Time. 2010, SPE 119147, pp. 526-544) (Year: 2010).*

International Search Report and Written Opinion issued in corresponding International Patent Application No. PCT/US2022/018984, dated Jun. 3, 2022 (11 pages).

Coats, B.K., "A Generalized Wellbore and Surface Facility Model, Fully Coupled to a Reservoir Simulator", SPE 79704, Society of Petroleum Engineers, Apr. 2004 (11 pages).

Stone, T.W. et al., "Thermal Simulation With Multisegment Wells", SPE 78131, Society of Petroleum Engineers, Jun. 2002 (13 pages).

Dogru et al., "A Next-Generation Parallel Reservoir Simulator for Giant Reservoirs", SPE 119272, Society of Petroleum Engineers, Feb. 2009 (29 pages).

Al-Shaalan et al., "Parallel Computation for Complex Wells Modeling in Full-Field Reservoir Simulation", SPE-182657-MS, Society of Petroleum Engineers, Feb. 2017 (11 pages).

* cited by examiner

METHOD AND SYSTEM FOR A MULTI-LEVEL NONLINEAR SOLVER FOR RESERVOIR SIMULATIONS

BACKGROUND

In a reservoir grid model, reservoir grid properties and well properties may be used to simulate production and injection at a reservoir. Depending on the simulation's equations and parameters, calculated solutions during a simulation may range from being highly linear to highly nonlinear. Under nonlinear circumstances, some reservoir simulations may demonstrate difficulty in finding solutions that converge to the available grid data and well data.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining, by a computer processor, grid model data for a geological region of interest and well data for various wells in the geological region of interest. A well among the wells corresponds to a simulated well network in a reservoir simulation. The method further includes determining, by the computer processor and based on the grid model data and the well data, a first simulation solution for a first constraint rate equation decoupled from the simulated well network and using a first search method. The method further includes determining, by the computer processor and based on the grid model data, the well data, and the first simulation solution, a second simulation solution for a second constraint rate equation coupled to the simulated well network and using a second search method. The method further includes performing, by the computer processor and based on the grid model data, and the second simulation solution, the reservoir simulation of the geological region of interest for a predetermined period of time using a third search method.

In general, in one aspect, embodiments relate to a system that include various wells in a geological region of interest and a reservoir simulator that includes a computer processor and coupled to the wells. The reservoir simulator obtains grid model data for the geological region of interest. The reservoir simulator obtains, from the wells, well data. A well among the wells corresponds to a simulated well network in a reservoir simulation. The reservoir simulator determines, based on the grid model data and the well data, a first simulation solution for a first constraint rate equation decoupled from the simulated well network and using a first search method. The reservoir simulator determines, based on the grid model data, the well data, and the first simulation solution, a second simulation solution for a second constraint rate equation coupled to the simulated well network and using a second search method. The reservoir simulator performs, based on the grid model data and the second simulation solution, the reservoir simulation of the geological region of interest for a predetermined period of time using a third search method.

In general, in one aspect, embodiments relate to a non-transitory computer readable medium storing instructions executable by a computer processor. The instructions obtain grid model data for a geological region of interest and well data for various wells in the geological region of interest. A well among the wells corresponds to a simulated well network in a reservoir simulation. The instructions further determine, based on the grid model data and the well data, a first simulation solution for a first constraint rate equation decoupled from the simulated well network and using a first search method. The instructions further determine, based on the grid model data, the well data, and the first simulation solution, a second simulation solution for a second constraint rate equation coupled to the simulated well network and using a second search method. The instructions further perform, based on the grid model data and the second simulation solution, the reservoir simulation of the geological region of interest for a predetermined period of time using a third search method.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
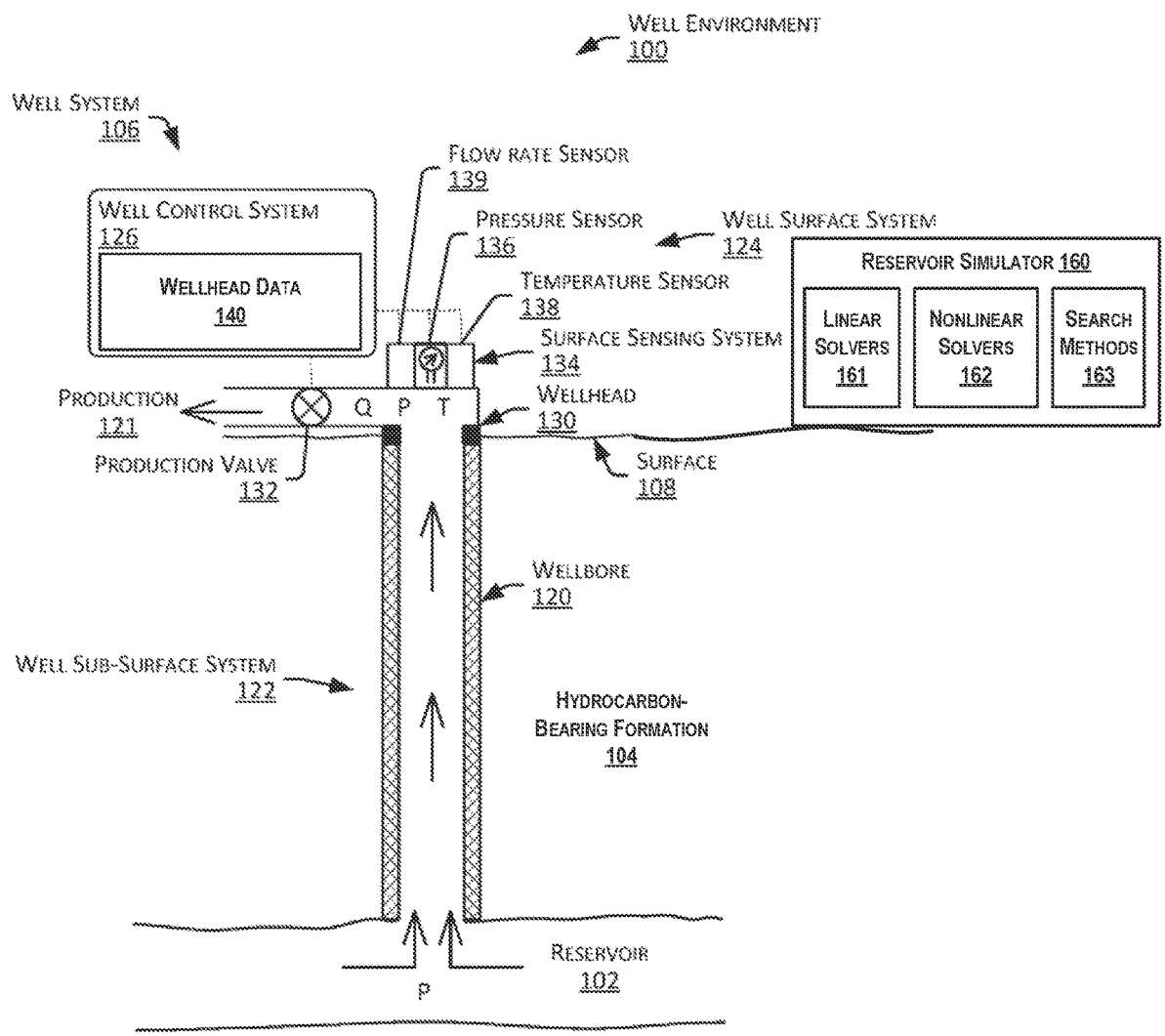
FIGS. 1, 2A, 2B, and 3 show systems in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for using a multi-level nonlinear solver to determine simulation solutions in a reservoir simulation. For example, a reservoir simulation may be divided into one set of solving processes for a simulated well network (e.g., for one or more wells) and another separate set of solving processes for the remaining reservoir properties of a grid model. More specifically, solving processes for the wells may be further divided into multiple iterative processes, where a reservoir simulator initially solves a decoupled constraint rate equation for a simulated well network. After finding a simulation solution for the decoupled constraint equation, the reservoir simulator may use this simulation solution as the starting point for solving the constraint equation again, but now coupled to variables and equations associated with the rest of the simulated well network. Thus, some embodiments include workflows that use a sequential two-level nonlinear solver, where one or more inner solvers are used on a constraint rate equation, and then a simulated well network and reservoir grid are solved together using an outer solver. After determining a simulation solution for one or more simulated well networks, the simulated well network may be coupled with a reservoir grid solution using explicit coupling, sequential coupling, and/or implicit coupling.

Furthermore, some embodiments enable a reservoir simulator to use different types of search methods (e.g., Newton-Raphson, secant, bisection, etc.) for different solving stages. For example, using different search methods (e.g., search methods (163)) may increase the rate and chance of achieving a converged solution. Likewise, a complex well may have difficulties converging when attempting to solve a particular rate constraint (e.g., a constraint rate equation). Where a constraint rate equation may be a small portion of the total well equations requiring solutions, a constraint rate equation may bottleneck a reservoir simulation through a slow convergence. For illustration, solving a constraint rate equation may be difficult where a well has a very low production rate, while the productivity index of the well is also very high. In this example, wellbore pressure may be very close to a reservoir gridblock pressure causing a perforation in the reservoir to switch between production and injection over various solving iterations. Such discontinuities in a complex well system may make some search methods (e.g., Newton-Raphson method) more difficult in achieving convergence.

In some embodiments, a reservoir simulator also has difficulty solving a complex well having a well completion in a multi-phase zone. In this situation, various perforations may be producing different fluid fractions with different fluid rates. Resulting variations in fluid properties (e.g., among water-cut values) over several iterations may produce a convergence problem due to the significant variation of fluid density. Thus, lagging in solving a component mole fraction in a constraint rate equation may cause an inability to achieve convergence by one or more nonlinear solvers.

Turning to FIG. 1, FIG. 1 shows a schematic diagram in accordance with one or more embodiments. As shown in FIG. 1, FIG. 1 illustrates a well environment (100) that includes a hydrocarbon reservoir ("reservoir") (102) located in a subsurface hydrocarbon-bearing formation (104) and a well system (106). The hydrocarbon-bearing formation (104) may include a porous or fractured rock formation that resides underground, beneath the earth's surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock having varying characteristics, such as varying degrees of permeability, porosity, and resistivity. In the case of the well system (106) being operated as a production well, the well system (106) may facilitate the extraction of hydrocarbons (or "production") from the reservoir (102).

In some embodiments, the well system (106) includes a wellbore (120), a well sub-surface system (122), a well surface system (124), and a well control system (126). The control system (126) may control various operations of the well system (106), such as well production operations, well completion operations, well maintenance operations, and reservoir monitoring, assessment and development operations. In some embodiments, the control system (126) includes a computer system that is the same as or similar to that of computer system (702) described below in FIG. 7 and the accompanying description.

The wellbore (120) may include a bored hole that extends from the surface (108) into a target zone of the hydrocarbon-bearing formation (104), such as the reservoir (102). An upper end of the wellbore (120), terminating at or near the surface (108), may be referred to as the "up-hole" end of the wellbore (120), and a lower end of the wellbore, terminating in the hydrocarbon-bearing formation (104), may be referred to as the "down-hole" end of the wellbore (120). The wellbore (120) may facilitate the circulation of drilling fluids during drilling operations, the flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) into the hydrocarbon-bearing formation (104) or the reservoir (102) during monitoring operations (e.g., during in situ logging operations).

In some embodiments, during operation of the well system (106), the control system (126) collects and records wellhead data (140) for the well system (106). The wellhead data (140) may include, for example, a record of measurements of wellhead pressure (P) (e.g., including flowing wellhead pressure (FWHP)), wellhead temperature (T) (e.g., including flowing wellhead temperature), wellhead production rate (Q) over some or all of the life of the well (106), and water cut data. In some embodiments, the measurements are recorded in real-time, and are available for review or use within seconds, minutes or hours of the condition being sensed (e.g., the measurements are available within 1 hour of the condition being sensed). In such an embodiment, the wellhead data (140) may be referred to as "real-time" wellhead data (140). Real-time wellhead data (140) may enable an operator of the well (106) to assess a relatively current state of the well system (106), and make real-time decisions regarding development of the well system (106) and the reservoir (102), such as on-demand adjustments in regulation of production flow from the well.

With respect to water cut data, the well system (106) may include one or more water cut sensors. For example, a water cut sensor may be hardware and/or software with functionality for determining the water content in oil, also referred to as "water cut." Measurements from a water cut sensor may be referred to as water cut data and may describe the ratio of water produced from the wellbore (120) compared to the total volume of liquids produced from the wellbore (120). Water cut sensors may implement various water cut measuring techniques, such as those based on capacitance measurements, Coriolis effect, infrared (IR) spectroscopy, gamma ray spectroscopy, and microwave technology. Water cut data may be obtained during production operations to determine various fluid rates found in production from the well system (106). This water cut data may be used to determine water-to-gas information regarding the wellhead (130).

In some embodiments, a water-to-gas ratio (WGR) is determined using a multiphase flow meter. For example, a multiphase flow meter may use magnetic resonance information to determine the number of hydrogen atoms in a particular fluid flow. Since oil, gas and water all contain hydrogen atoms, a multiphase flow may be measured using magnetic resonance. In particular, a fluid may be magnetized and subsequently excited by radio frequency pulses. The hydrogen atoms may respond to the pulses and emit echoes that are subsequently recorded and analyzed by the multiphase flow meter.

In some embodiments, the well surface system (124) includes a wellhead (130). The wellhead (130) may include a rigid structure installed at the "up-hole" end of the wellbore (120), at or near where the wellbore (120) terminates at the Earth's surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include one or more production valves (132) that are operable to control the flow of production (134). For example, a production valve (132) may be fully opened to enable unrestricted flow of production (121) from the wellbore (120), the production valve (132) may be partially opened to partially restrict (or "throttle") the flow of production (121) from the wellbore (120), and production valve (132) may be fully closed to fully restrict (or "block") the flow of production (121) from the wellbore (120), and through the well surface system (124).

Keeping with FIG. 1, in some embodiments, the well surface system (124) includes a surface sensing system (134). The surface sensing system (134) may include sensors for sensing characteristics of substances, including production (121), passing through or otherwise located in the well surface system (124). The characteristics may include, for example, pressure, temperature and flow rate of production (121) flowing through the wellhead (130), or other conduits of the well surface system (124), after exiting the wellbore (120).

In some embodiments, the surface sensing system (134) includes a surface pressure sensor (136) operable to sense the pressure of production (151) flowing through the well surface system (124), after it exits the wellbore (120). The surface pressure sensor (136) may include, for example, a wellhead pressure sensor that senses a pressure of production (121) flowing through or otherwise located in the wellhead (130). In some embodiments, the surface sensing system (134) includes a surface temperature sensor (138) operable to sense the temperature of production (151) flowing through the well surface system (124), after it exits the wellbore (120). The surface temperature sensor (138) may include, for example, a wellhead temperature sensor that senses a temperature of production (121) flowing through or otherwise located in the wellhead (130), referred to as "wellhead temperature" (T). In some embodiments, the surface sensing system (134) includes a flow rate sensor (139) operable to sense the flow rate of production (151) flowing through the well surface system (124), after it exits the wellbore (120). The flow rate sensor (139) may include hardware that senses a flow rate of production (121) (Q) passing through the wellhead (130).

Keeping with FIG. 1, when completing a well, one or more well completion operations may be performed prior to delivering the well to the party responsible for production or injection. Well completion operations may include casing operations, cementing operations, perforating the well, gravel packing, directional drilling, hydraulic stimulation of a reservoir region, and/or installing a production tree or wellhead assembly at the wellbore (120). Likewise, well operations may include open-hole completions or cased-hole completions. For example, an open-hole completion may refer to a well that is drilled to the top of the hydrocarbon reservoir. Thus, the well is cased at the top of the reservoir, and left open at the bottom of a wellbore. In contrast, cased-hole completions may include running casing into a reservoir region. Cased-hole completions are discussed further below with respect to perforation operations.

In another well operation example, the sides of the wellbore (120) may require support, and thus casing may be inserted into the wellbore (120) to provide such support. After a well has been drilled, casing may ensure that the wellbore (120) does not close in upon itself, while also protecting the wellstream from outside incumbents, like water or sand. Likewise, if the formation is firm, casing may include a solid string of steel pipe that is run on the well and will remain that way during the life of the well. In some embodiments, the casing includes a wire screen liner that blocks loose sand from entering the wellbore (120).

In another well operation example, a space between the casing and the untreated sides of the wellbore (120) may be cemented to hold a casing in place. This well operation may include pumping cement slurry into the wellbore (120) to displace existing drilling fluid and fill in this space between the casing and the untreated sides of the wellbore (120). Cement slurry may include a mixture of various additives and cement. After the cement slurry is left to harden, cement may seal the wellbore (120) from non-hydrocarbons that attempt to enter the wellstream. In some embodiments, the cement slurry is forced through a lower end of the casing and into an annulus between the casing and a wall of the wellbore (120). More specifically, a cementing plug may be used for pushing the cement slurry from the casing. For example, the cementing plug may be a rubber plug used to separate cement slurry from other fluids, reducing contamination and maintaining predictable slurry performance. A displacement fluid, such as water, or an appropriately weighted drilling fluid, may be pumped into the casing above the cementing plug. This displacement fluid may be pressurized fluid that serves to urge the cementing plug downward through the casing to extrude the cement from the casing outlet and back up into the annulus.

Keeping with well operations, some embodiments include perforation operations. More specifically, a perforation operation may include perforating casing and cement at different locations in the wellbore (120) to enable hydrocarbons to enter a wellstream from the resulting holes. For example, some perforation operations include using a perforation gun at different reservoir levels to produce holed sections through the casing, cement, and sides of the wellbore (120). Hydrocarbons may then enter the wellstream through these holed sections. In some embodiments, perforation operations are performed using discharging jets or shaped explosive charges to penetrate the casing around the wellbore (120).

In another example, a filtration system may be installed in the wellbore (120) in order to prevent sand and other debris from entering the wellstream. For example, a gravel packing operation may be performed using a gravel-packing slurry of appropriately sized pieces of coarse sand or gravel. As such, the gravel-packing slurry may be pumped into the wellbore (120) between a casing's slotted liner and the sides of the wellbore (120). The slotted liner and the gravel pack may filter sand and other debris that might have otherwise entered the wellstream with hydrocarbons.

In some embodiments, the well system (106) includes a reservoir simulator (160). For example, the reservoir simulator (160) may include hardware and/or software with functionality for generating one or more reservoir models regarding the hydrocarbon-bearing formation (104) and/or performing one or more reservoir simulations. For example, the reservoir simulator (160) may store well logs and data regarding core samples for performing simulations. A reservoir simulator may further analyze the well log data, the core sample data, seismic data, and/or other types of data to generate and/or update the one or more reservoir models. While the reservoir simulator (160) is shown at a well site, embodiments are contemplated where reservoir simulators are located away from well sites. In some embodiments, the reservoir simulator (160) may include a computer system that is similar to the computer system (702) described below with regard to FIG. 7 and the accompanying description.

In some embodiments, a reservoir simulator includes one or more linear solvers (e.g., linear solvers (161)) and/or one or more nonlinear solvers (e.g., nonlinear solvers (162)). In particular, linear solver and nonlinear solvers may include hardware and/or software that perform mathematical operations in order to determine a solution to a predetermined mathematical problem. For example, a solver may be arbitrarily nested (i.e., as a "nested solver") within a simulation workflow that determines individual property values of one or more linear equations (e.g., values within a single grid or multiple grids) or one or more nonlinear equations.

With respect to nonlinear equations, a nonlinear solver may determine a solution to a nonlinear system, in which a change of an output is not proportional to a change of an input to the nonlinear system. As such, a nonlinear solver may be an iterative solver that implements a repeating algorithmic procedure that includes one or more predetermined termination criteria (e.g., when a particular criterion is satisfied based on an updated value, the iterative method may terminate). Likewise, an iterative solver may use a search method, such as a Newton-Raphson method (also called "Newton's method"), a secant method, or a bisection method, to determine a solution to a particular problem or equation. For example, a Newton-Raphson method may include a root-finding algorithm that produces successively better approximations to the roots of a real-valued function. A secant method may include a root-finding algorithm that uses a succession of roots of secant lines to better approximate a root of a real-valued function. A bisection method (also called a "binary search method") may include a root-finding algorithm applicable to various continuous functions that has two known values with opposite signs. The bisection method may repeatedly bisect an interval defined by these known values and then select a subinterval in which a continuous function changes signs (i.e., that contains a root).

Figure 2A:
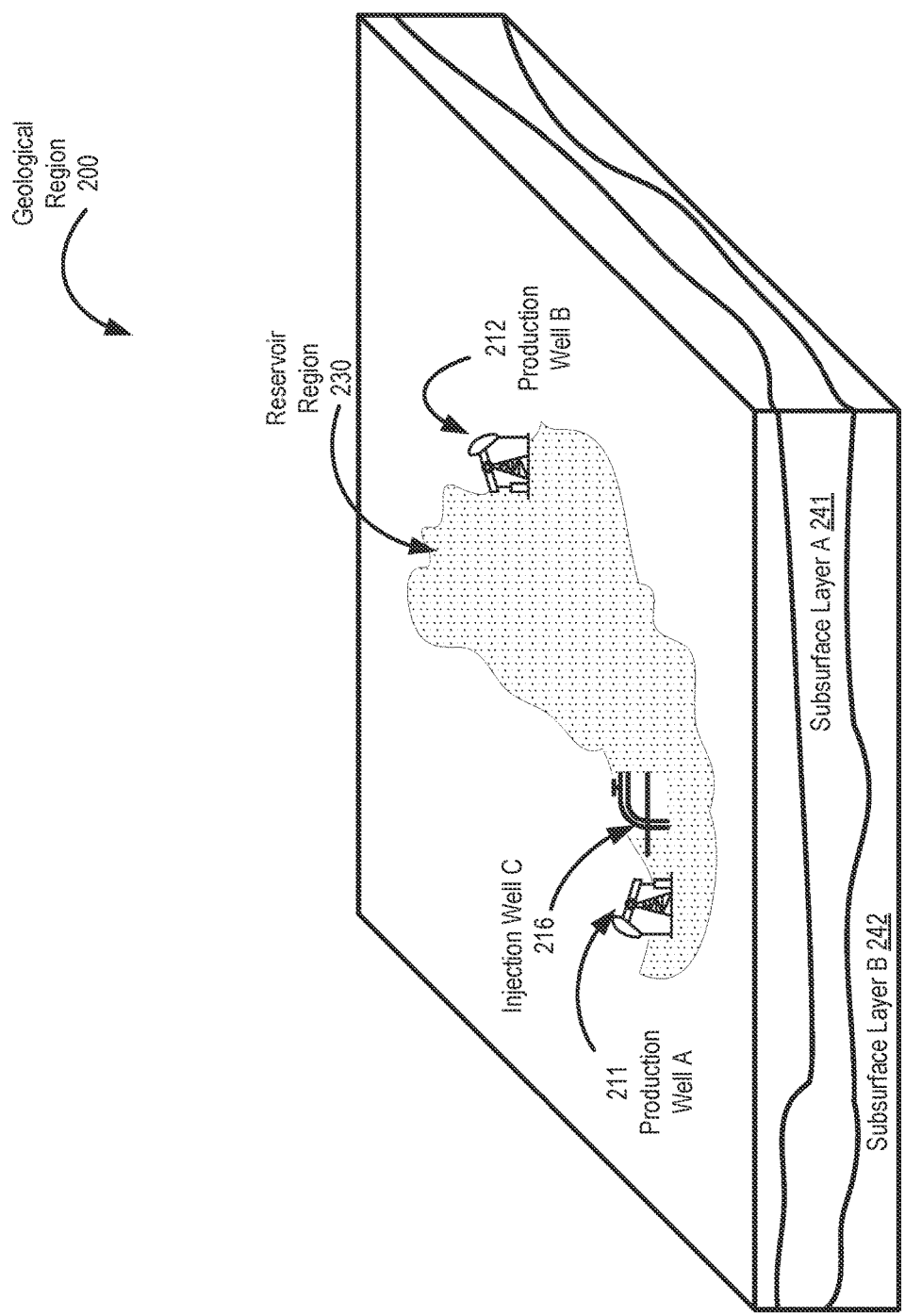

Turning to FIG. 2A, FIG. 2A shows a schematic diagram in accordance with one or more embodiments. As illustrated in FIG. 2A, FIG. 2A shows a geological region (200) that may include one or more reservoir regions (e.g., reservoir region (230)) with various production wells (e.g., production well A (211), production well (212)). For example, a production well may be similar to the well system (106) described above in FIG. 1 and the accompanying description. Likewise, a reservoir region may also include one or more injection wells (e.g., injection well C (216)) that include functionality for enhancing production by one or more neighboring production wells. As shown in FIG. 2A, wells may be disposed in the reservoir region (230) above various subsurface layers (e.g., subsurface layer A (241), subsurface layer B (242)), which may include hydrocarbon deposits. In particular, production data and/or injection data may exist for a particular well, where production data may include data that describes production or production operations at a well, such as wellhead data (140) described in FIG. 1 and the accompanying description.

Figure 2B:
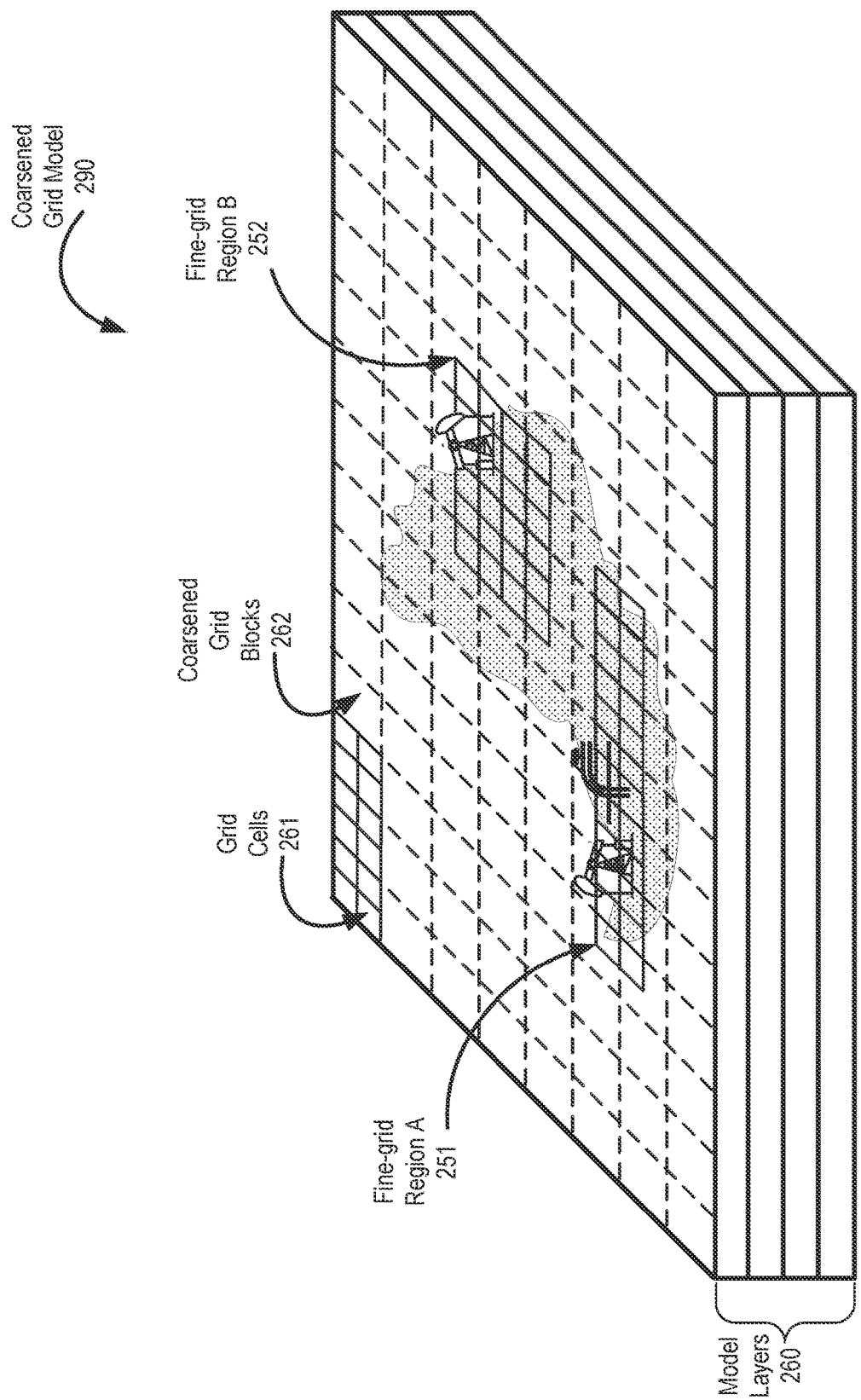

Turning to FIG. 2B, FIG. 2B shows a schematic diagram in accordance with one or more embodiments. As illustrated in FIG. 2B, FIG. 2B shows a coarsened grid model (290) that corresponds to the geological region (200) from FIG. 2A. More specifically, the coarsened grid model (290) includes grid cells (261) that may refer to an original cell of a grid model as well as coarsened grid blocks (262) that may refer to an amalgamation of original cells of the grid model. For example, a grid cell may be the case of a 1×1 block, where coarsened grid blocks may be of sizes 2×2, 4×4, 8×8, etc. Both the grid cells (261) and the coarsened grid blocks (262) may correspond to columns for multiple model layers (260) within the coarsened grid model (290).

Prior to performing a reservoir simulation, local grid refinement and coarsening (LGR) may be used to increase or decrease grid resolutions in various regions of a grid model. For example, various reservoir properties, e.g., permeability, porosity, or saturations, may correspond to discrete values that are associated with a particular grid cell or coarsened grid block. However, by using discrete values to represent a portion of a geological region, a discretization error may occur in a reservoir simulation. Thus, various fine-grid regions may reduce discretization errors as the numerical approximation of a finer grid is closer to the exact solution, however through a higher computational cost. As shown in FIG. 2B, for example, the coarsened grid model (290) may include various fine-grid regions (i.e., fine-grid region A (251), fine-grid region B (252)), that are surrounded by coarsened block regions. Likewise, the original grid model without any coarsening may be referred to as a fine-grid model.

Figure 3:
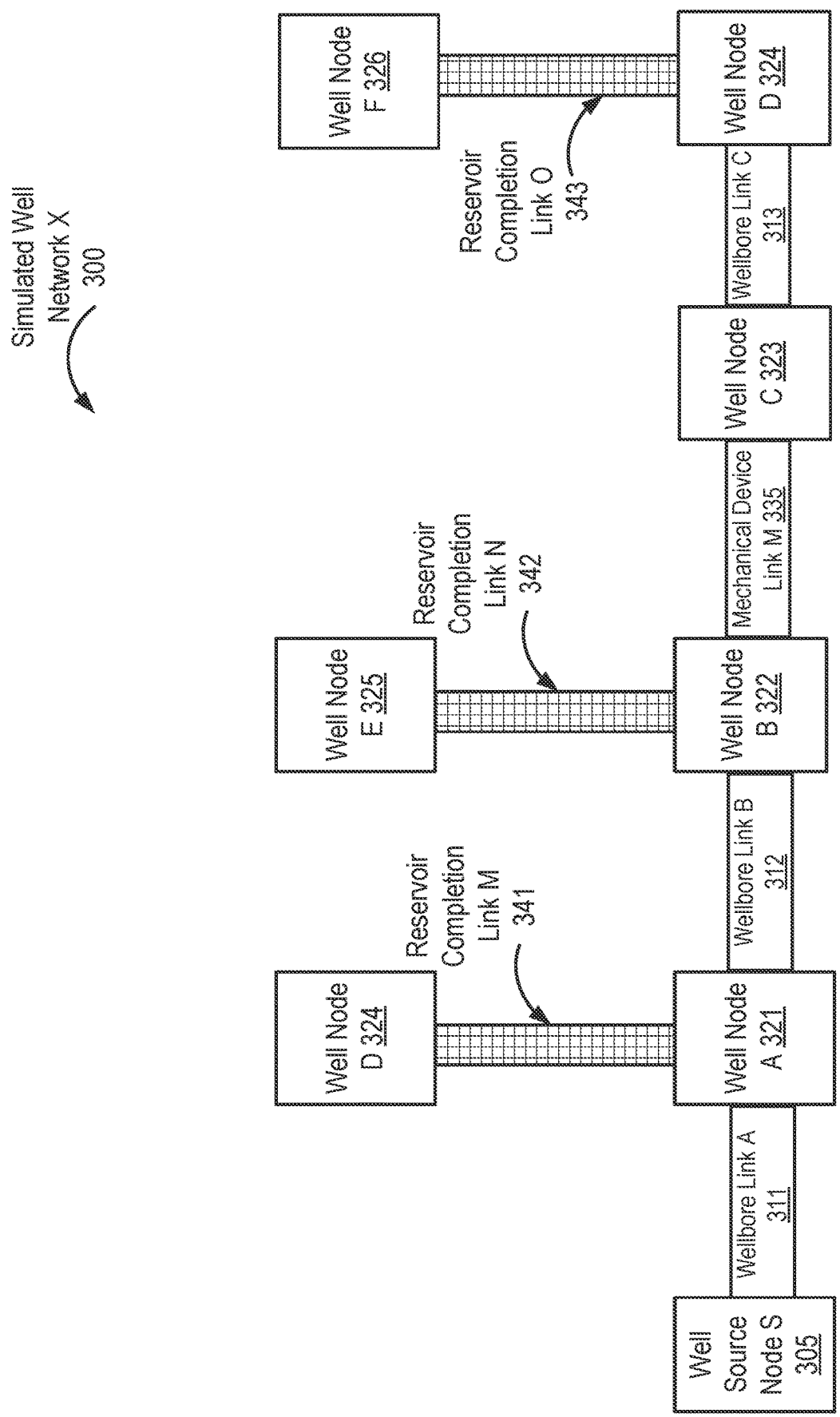

Turning to FIG. 3, FIG. 3 shows a schematic diagram in accordance with one or more embodiments. In FIG. 3, a simulated well network may describe various rock and fluid interactions with respect to production and/or injection by a well system at a well environment. In particular, a reservoir simulator may use a simulated well network to model horizontal and multilateral well drilling technologies as well as complex wellbore configurations resulting from implementation of intelligent completion systems. Accordingly, a simulated well network may provide a detailed representation of wellbore compositions, fluid rates, and pressure distributions for various complex well geometries, increased lengths of perforated intervals, and the potential presence of downhole-flow-control devices in wells. Likewise, a simulated well network may assist in modeling low-potential recovery methods such as steam-assisted gravity drainage.

Keeping with FIG. 3, a simulated well network (e.g., simulated well network X (300)) may include various network links, such as wellbore links (e.g., wellbore link A (311), wellbore link B (312), wellbore link C (313)), reservoir completion links (e.g., reservoir completion link M (341), reservoir completion link N (342), reservoir completion link O (343)), and mechanical device links (e.g., mechanical device link M (335)). A wellbore link may represent a wellbore trajectory segment, while a reservoir completion link may represent a specific type of completion connection (e.g., a hydraulic stimulation or a perforation of the well). A mechanical device link may represent a mechanical device in a well, such as an inflow control device (ICD), an inflow control value (ICV), a well compartment etc. A simulated well network may also include various nodes that are adjacent to links, such as well node A (321), well node B (322), well node C (323), well node D (324), well node E (325), and well node F (326). For example, a node may be a connection between two or more links. Likewise, a simulated well network may have a node that acts as a well source node (e.g., well source node S (305)) that specifies a fixed bottom-hole pressure or a specified liquid rate for a well.

In some embodiments, a reservoir simulator uses a simulated well network as a general network concept to model wells using links and nodes. Thus, a particular well may be represented by a graph in a simulated well network. As such, a simulated well network may use a model with a unified compositional formulation, where the formulation may be general enough to handle both black-oil and compositional simulations. Furthermore, a simulated well network may be used to solve mass balance equations and momentum balance equations using pressure drop calculations. In addition, boundary conditions for wells, mechanical device pressures, and fluid rates may be represented as constraint rate equations within a simulated well network. For example, a mass balance equation may equalize a total molar rate for a given network link to the total molar rate output by using a quasi-steady-state assumption. Thus, a constraint rate equation may represent a total molar rate at a particular well. In some embodiments, a mass balance equation is defined using the following equation:

$$\Sigma N_{in} = \Sigma N_{out} \quad \text{Equation (1)}$$

where $N_{in}$ is the total molar inflow rate, and $N_{out}$ is the total molar outflow rate. Moreover, a flow from a reservoir to the wellbore may pass through one or more reservoir completion links, such as perforation links, that use a well inflow performance relationship. In some embodiments, the well inflow performance relationship may be defined using the following equations:

$$N = \Sigma N_i, N_i = \Sigma_{p=o,w,g} \lambda_{i,p} \cdot PI \cdot (P_r - P_w) \quad \text{Equations (2)}$$

where N corresponds to a total molar rate at a simulated well network, $N_i$ corresponds to a component molar rate from rock or reservoir regions to the wellbore, $\lambda_{i,p}$ corresponds to a component mobility for a particular phase, i.e., where p may correspond to o=oil, w=water, and g=gas, PI corresponds to a rock productivity index, and $P_w$ corresponds to a wellbore pressure, and $P_r$ corresponds to a reservoir pressure.

Furthermore, a simulated well network may be highly nonlinear. For example, fluid properties may be very sensitive to network variables like pressure values and rate values. Moreover, a simulation may lag in the calculation of some properties, such as a component mole fraction L. Also, significant variation in fluid properties like density over various simulation iterations may be due to the changes in water cut values. In addition, phase changes in the wellbore may result due to pressure losses. Thus, property changes within a reservoir simulation may cause numerical difficulties in a nonlinear solver and thus impact convergence of a simulation solution.

While FIGS. 1, 2A, 2B and 3 shows various configurations of hardware components and/or software components, other configurations may be used without departing from the scope of the disclosure. For example, various components in FIGS. 1, 2A, 2B, and 3 may be combined to create a single component. As another example, the functionality performed by a single component may be performed by two or more components.

Figure 4:
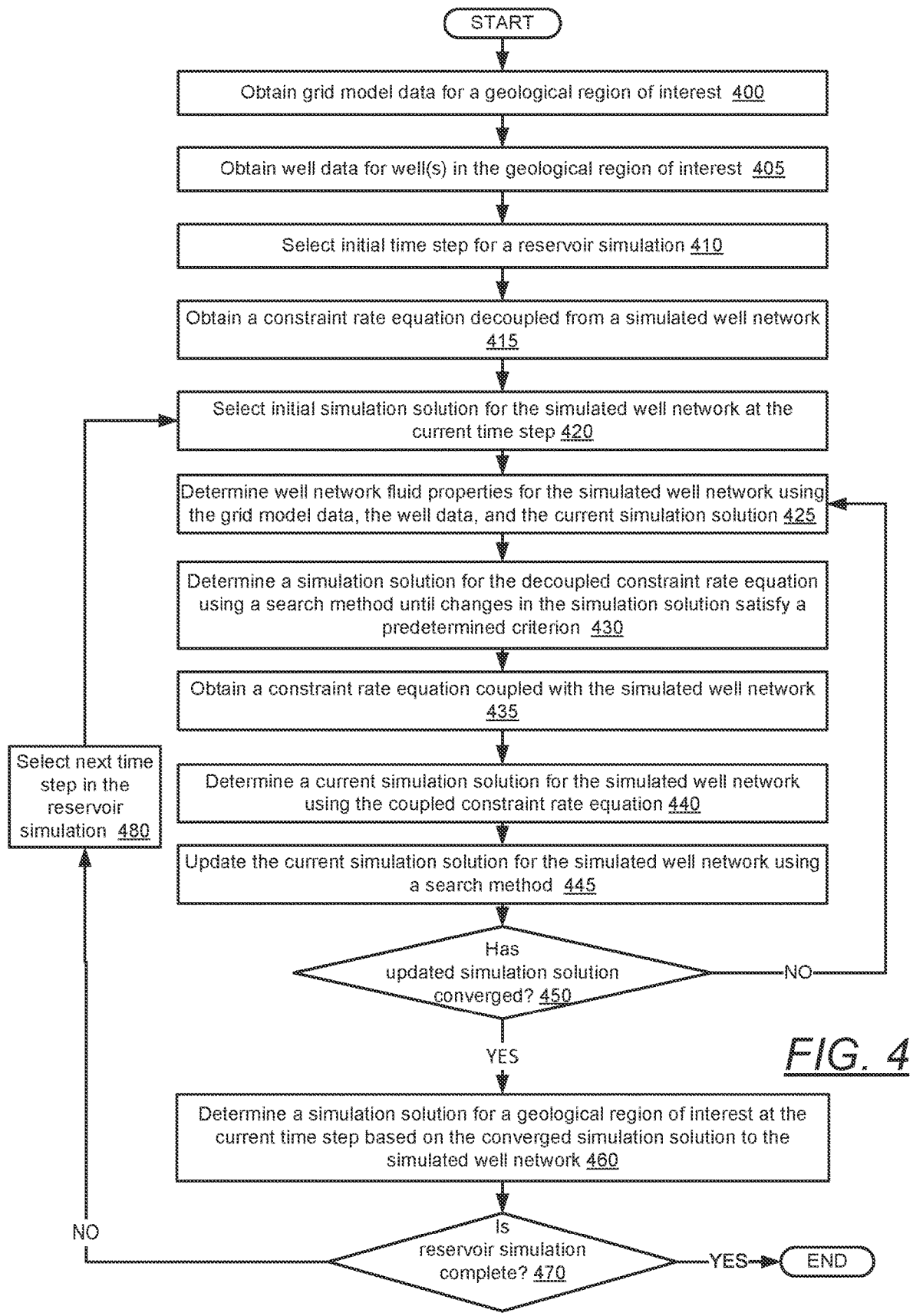
FIG. 4 shows a flowchart in accordance with one or more embodiments.

Turning to FIG. 4, FIG. 4 shows a flowchart in accordance with one or more embodiments. Specifically, FIG. 4 describes a general method for simulating a geological region of interest using one or more nonlinear solvers. One or more blocks in FIG. 4 may be performed by one or more components (e.g., reservoir simulator (160)) as described in FIGS. 1, 2A, 2B, and 3. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, grid model data are obtained for a geological region of interest in accordance with one or more embodiments. For example, a reservoir simulator may access model data from a fine-grid model or other grid model, where the grid model data includes various reservoir property values, such as oil saturation, water saturation, porosity, permeability, etc. In some embodiments, the grid model data may be based on a user selection within a graphical user interface on a user device. Likewise, the grid model data may correspond to a geological region of interest that includes one or more reservoir regions selected for running simulations. A geological region of interest may be a portion of a geological area or volume that includes one or more wells or formations of interest desired or selected for further analysis, e.g., for predicting future hydrocarbon production or reservoir development purposes for a respective reservoir. For example, the geological region of interest may be similar to geological region (200) or reservoir region (230) described above in FIG. 2A and the accompanying description.

In Block 405, well data are obtained for one or more wells in a geological region of interest in accordance with one or more embodiments. For example, well data may correspond to wellhead data described above in FIG. 1 as well as various well design parameters, e.g., a type of wellbore, such as a vertical or horizontal well, various types of completion operations, whether the well is a production well or an injection well, etc. Well data may also include historical production data or historical injection data, such as flow rate data, surface pressure data, etc., or simulated well data from one or more previous reservoir simulations. The wells may be selected for running a simulation by a user or be associated with a grid model dataset. For example, the wells may be similar to well system (106), the production wells (211, 212), or the injection well (216) described above in FIGS. 1 and 2A, respectively, and the accompanying description.

In Block 410, an initial time is selected for a reservoir simulation in accordance with one or more embodiments. For example, the initial time step may represent the moment at which oil and gas production begins in a simulation. Likewise, a reservoir simulator may select the initial time to correspond to the drilling of one or more new wells. In other embodiments, the initial time step may be chosen by a user or automatically by the reservoir simulator for any time in the life of a reservoir.

In Block 415, a constraint rate equation is obtained that is decoupled from a simulated well network in accordance with one or more embodiments. In some embodiments, for example, a constraint rate equation corresponds to a well inflow relationship, such as described in Equations (1) and (2) above accompanying FIG. 3. In some embodiments, the constraint rate equation may be defined using the following equation:

$$N - \theta_s Q = 0 \quad \text{Equation (3)}$$

where N is the well source/sink total molar rate, Q is the specified surface flow rate, and $\theta_s$ denotes the ratio of standard volume rate to total molar rate. $\theta_s$ is calculated using the mole fraction weighted phase specific volume with the following formula:

$$\theta_s = \frac{1}{\sum f_i V_i} \quad \text{Equation (4)}$$

where $f_i$ is mole fraction for a given phase, and $V_i$ is the specific volume for a given phase. For example, for a given liquid surface rate, θs is calculated from mole fraction weighted average of water specific volume and oil specific volume. Accordingly, a constraint rate equation may be decoupled from other variables within a simulated well network (e.g., in regard to mechanical device links and other internal network links) to simplify operations for a particular solver. Likewise, a decoupled constraint rate equation may be solved using one or more constant boundary conditions. Based on Equation (3) and using the Taylor expansion, a constraint rate equation may be determined using the following equations:

$$N^k - \theta_s^k Q + \Delta N - \Delta(\theta_s Q) = 0 \quad \text{Equation (5)}$$

$$N^k - \theta_s^k Q + \Delta N - Q \frac{\partial \theta_s}{\partial N} \Delta N = 0 \quad \text{Equation (6)}$$

which may be further expressed as the following equation:

$$N^{k+1} - N^k = \Delta N = \frac{\theta_s^k Q - N^k}{1 - Q \frac{\partial \theta_s}{\partial N}} \quad \text{Equation (7)}$$

where N is the well source/sink total molar rate that is being solved, k corresponds to the current iteration of a simulation solution within a solving algorithm (e.g., a multi-level nonlinear solver), ΔN corresponds to the difference in molar rates between the current simulation solution and the previous simulation solution, and $$\frac{\partial \theta_s}{\partial N}$$

corresponds to the derivative of a change in a well source's molar density with respect to changes in the total molar rate, and Q is the specified surface flow rate.

In Block 420, an initial simulation solution is selected for a simulated well network at a current time step in accordance with one or more embodiments. For example, prior to beginning an iteration within a nonlinear solver, a simulation solution is selected with one or more default values. In other words, this simulation solution may be an initial guess that is subsequently updated over various iterations of a nonlinear solver. With respect to solving a constraint rate equation, the initial simulation solution may be expressed using the following equation:

$$X^0 = [P^0, N^0] \quad \text{Equation (8)}$$

where $X^0$ is the initial simulation solution, $P^0$ is the initial value of wellhead pressure, and $N^0$ is the initial value of the total molar rate, and k is a value of '0' to represent the initial iteration. In subsequent iterations, the simulation solution X may be updated using one or more search methods.

In Block 425, various well network fluid properties are determined for a simulated well network using grid model data, well data, and a current simulation solution in accordance with one or more embodiments. In particular, well network fluid properties may be determined using direct methods that have a finite series of operations. For example, these well network fluid properties may include values for density, viscosity, phase volume, and/or pressure drops. Likewise, the values of the well network fluid properties may be determined using a linear solver.

In Block 430, a simulation solution is determined for a decoupled constraint rate equation using a search method until changes to a simulation solution satisfy a predetermined criterion in accordance with one or more embodiments. In some embodiments, for example, a reservoir simulator may use a two-level nonlinear solver to determine convergence of a constraint rate equation. After building a network Jacobian matrix for a simulated well network, for example, a reservoir simulator may evaluate the residual $J\Delta X = -F(X^k)$, where J is the Jacobian matrix, ΔX is the change in simulation solutions between iterations of the two-level nonlinear solver, $X^k$ is the current simulation solution at the kth iteration, and F is a function corresponding to the constraint rate equation.

In the first level of the nonlinear solver, a reservoir simulator may solve the network Jacobian matrix with a fixed equation for a rate constraint using a search method satisfies a predetermined criterion, which may be a termination criterion. For example, the predetermined criterion may require updating the solution until the nonlinear system has a minimum change $\|\Delta X\| < \varepsilon_1$ The minimum change $\varepsilon_1$ may be selected by a user or automatically determined by the reservoir simulator (e.g., based on past reservoir simulations). In some embodiments, the search method is a Newton-Raphson method. However, other search methods are also contemplated such as a secant method or a bisection method. For example, if the Newton-Raphson method has difficulties solving the constraint rate equation, some other techniques may be employed.

In Block 435, a constraint rate equation is obtained that is coupled with a simulated well network in accordance with one or more embodiments. After a fixed rate constraint equation is solved, the rate constraint equation may be coupled with various well equations, such as mass balance equations and momentum balance equations, to represent a simulated well network. Accordingly, a full nonlinear system of the simulated well network may be solved using a search method, such as a Newton-Raphson method, a secant method, or a bisection method. In a two-level nonlinear solver, the coupled constraint rate equation may be solved at the second level.

In Block 440, a current simulation solution is determined for a simulated well network using a coupled constraint rate equation in accordance with one or more embodiments. For example, a reservoir simulator may solve a coupled constraint rate equation, i.e., $N - \theta_s Q = 0$, using a search method, such as a secant method or a bisection method. The selected search method for the coupled constraint rate equation may be different from the search method for the decoupled constraint rate equation.

In Block 445, a current simulation solution is updated for a simulated well network using a search method in accordance with one or more embodiments. With respect to Equations (5), (6), and (7) above, for example, a linear system for $\Delta X$, may be updated using the simulation solution $X^{k+1}=X^k+\Delta X$. Thus, implementing a two-step sequential nonlinear solver may reduce the number of oscillations required to achieve a convergence value for solving the simulated well network.

In Block 450, a determination is made whether an updated simulation solution has converged in accordance with one or more embodiments. For example, a reservoir simulator may analyze a change in the current simulated solution between one or more previous simulated solutions to determine convergence. If convergence is not detected, the reservoir simulator may perform another iteration (i.e., k=k+1). Where a determination is made that the updated simulation solution has converged, the process shown in FIG. 4 may proceed to Block 460. Where a determination is made that convergence is not achieved, the process shown in FIG. 4 may proceed to Block 425.

In some embodiments, complex well modeling may assist various well completion operations, such as drilling long horizontal wells, wells with multi-lateral branches, and wells having smart completions such as using ICDs and ICVs (e.g., smart completions may add additional complicated physics to a wellbore). Complex well modeling may also include simulations regarding wells that have very complex wellbore dynamics and multi-lateral completions in heterogeneous multi-phase reservoirs. However, complex well modelling may have convergence problems resulting in oscillations and unreliable simulation solutions. Thus, the use of a multi-level nonlinear solver may address one or more convergence problems in various complex well networks.

In Block 460, a simulation solution is determined for a geological region of interest at a current time step based on a converged simulation solution to a simulated well network in accordance with one or more embodiments. After determining a converged simulation solution for a simulated well network, another simulation solution may be determined for an entire geological region of interest for the current time step. In some embodiments, a reservoir simulator may determine various simulation solutions in parallel (e.g., using parallel processing) for one or more additional simulated well networks. Likewise, the reservoir simulator may couple solutions for various simulated well networks with one or more adjacent reservoir regions.

In some embodiments, one or more simulated well network solutions are coupled with a grid solution using various methods, such as explicit coupling, sequential coupling, and implicit coupling. With respect to explicit coupling (also called "one way coupling"), explicit coupling may be a type of iterative coupling where the information obtained from a simulation module (e.g., a geomechanics module) is not sent back to a reservoir simulator (i.e., no coupling iterations occur during a time step). An example of explicit coupling may be with respect to modeling gas reservoirs since the gas compressibility usually dominates the rock compressibility. With respect to implicit coupling, for example, a simulated well network may be solved together as a single system with a reservoir grid (i.e., from a grid model). Thus, boundary conditions of one or more wellbores may be updated within a single iteration along with boundary conditions for equations relating to the reservoir grid. In some embodiments, implicit coupling solves both well equations and geomechanical equations together for each respective time step of a reservoir simulation. With respect to sequential coupling, well equations and geomechanical equations may be divided into separate processes that are solved in a sequential scheme.

In Block 470, a determination is made whether a reservoir simulation is complete in accordance with one or more embodiments. For example, a reservoir simulator may determine a particular simulation has reached the final time step. Where a determination is made that the reservoir simulation has one or more time steps remaining, the process shown in FIG. 4 may proceed to Block 480. Where a determination is made that no time steps remain to determine for the reservoir simulation, the process shown in FIG. 4 may end.

Furthermore, various reservoir simulation applications may be performed, such as well-by-well history matching, predicting production rates at one or more wells, determining the presence of hydrocarbon-producing formations for new wells, rankings, uncertainty analyses, and/or sensitivity analyses. With respect to history matching, the objective may be to fit measured historical data to a reservoir model. In some embodiments, one or more reservoir simulations may optimize production for a well or group of wells, provide well design parameters for one or more wells, specify completion operations for one or more wells (e.g., by determining which down-hole devices to implement).

In Block 480, a next time step is selected in a reservoir simulation in accordance with one or more embodiments. For example, a reservoir simulator may increment a time variable within a reservoir simulation based on a predetermined increment size. Accordingly, the process in FIG. 4 may iteratively return to Blocks 420-460 to update one or more variables during the simulation process, e.g., reservoir grid values, flow rate values, pressure values, etc., for different time steps within a reservoir simulation.

Figure 5:
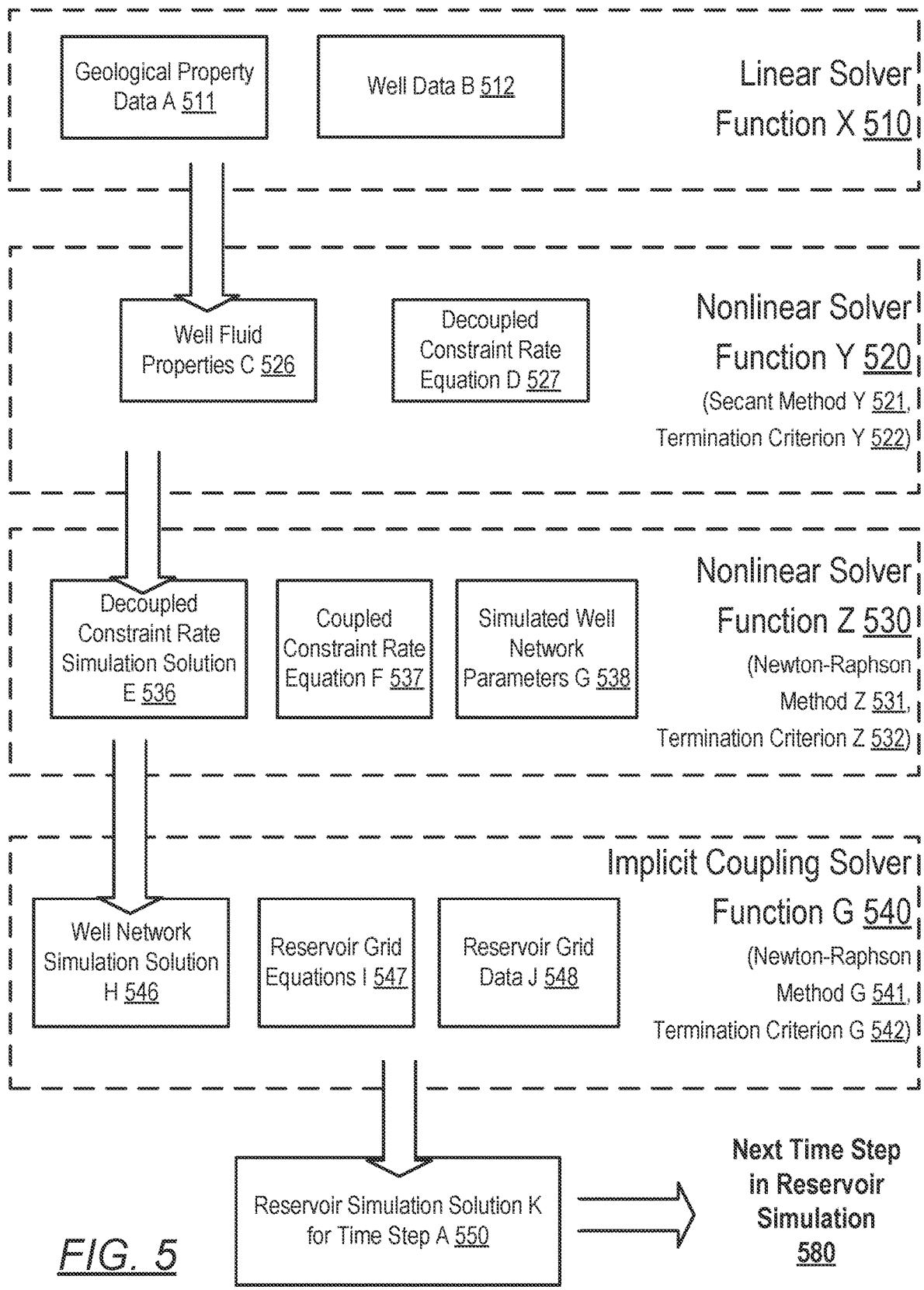
FIG. 5 shows an example in accordance with one or more embodiments.

Turning to FIG. 5, FIG. 5 provides an example of a reservoir simulation using a multi-level nonlinear solver in accordance with one or more embodiments. The following example is for explanatory purposes only and not intended to limit the scope of the disclosed technology.

Turning to FIG. 5, a reservoir simulator (not shown) accesses a grid model to obtain geological property data A (511) and well data B (512) in order to perform a reservoir simulation over a specified period of time. In particular, the reservoir simulator uses a multi-level nonlinear solver that includes a nonlinear solver function Y (520) and nonlinear solver function Z (530), and a linear solver (i.e., linear solver function X (510)). Here, the reservoir simulator uses the linear solver function X (510) to determine well fluid properties C (526), such as density, viscosity, etc. Using the well fluid properties C (526) and a decoupled constraint rate equation D (527), the reservoir simulator uses a nonlinear solver function Y (520) to determine a decoupled constraint rate simulation solution E (536). In particular, the nonlinear solver function Y (520) uses a secant method Y (521) as a search method and a termination criterion Y (522) as the predetermined criterion for ending the solver function. In particular, the termination criterion Y (522) designates a minimum changed value where the nonlinear solver function terminates once the difference in simulation solutions is below the minimum change value.

Keeping with FIG. 5, the reservoir simulator uses a nonlinear solver function Z (530) with a decoupled constraint rate simulation solution E (536), a coupled constraint rate equation F (537), and various simulated well network parameters G (538), to determine a well network simulation solution H (546). In particular, the nonlinear solver function Z (530) uses a Newton-Raphson method Z (531) as a search method and a termination criterion Z (532) as the predetermined criterion for ending the solver function. In particular, the termination criterion Z (532) designates convergence of the simulated solution as the criterion for ending the solver operation.

After convergence, the reservoir simulator uses the well network simulation solution H (546) as an input to an implicit coupling solver function G (540) that uses a Newton-Raphson Method G (541) and a termination criterion G (542). With the implicit coupling solver function G (540), the reservoir simulator determines a reservoir simulation solution K (550) for a time step A for various reservoir grid equations I (547) based on reservoir grid data J (548), the well network simulation solution H (546), and various other simulation solutions for other simulated well networks disposed in the reservoir grid model. However, the reservoir simulator may also use explicit coupling solver functions or sequential solver functions to determine a simulation solution for the reservoir grid model. Once the reservoir simulation is completed for time step A, the reservoir simulator moves to the next time step (580) in the reservoir simulation.

Figure 6A:
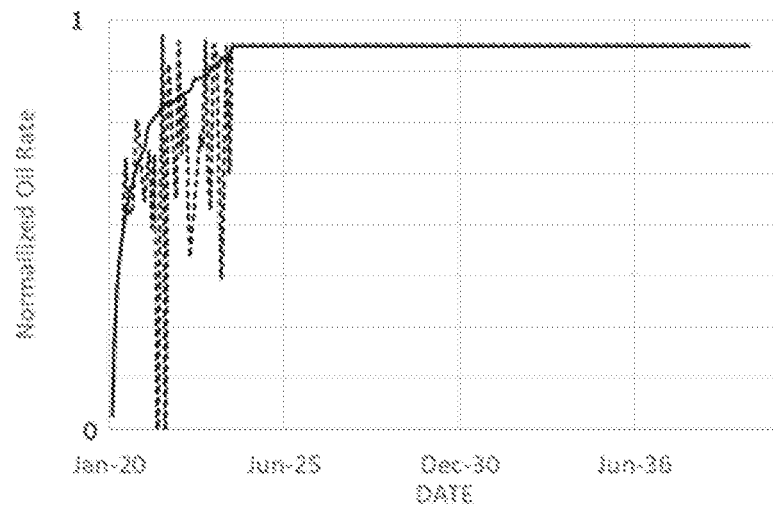
FIGS. 6A, 6B, and 6C show examples in accordance with one or more embodiments.
Figure 6B:
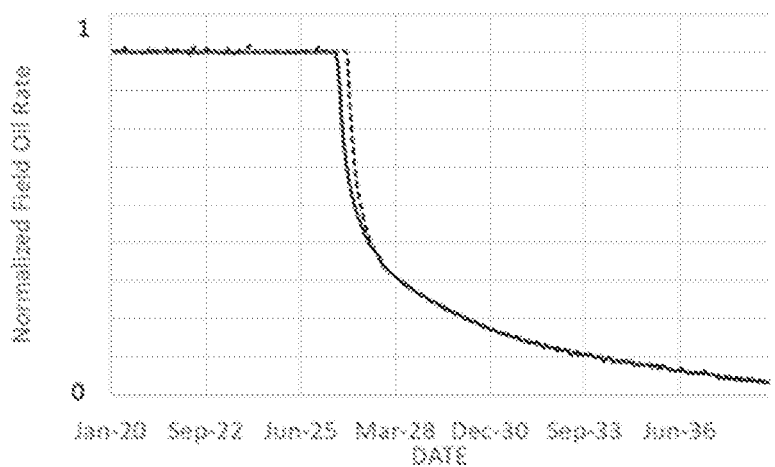
Figure 6C:
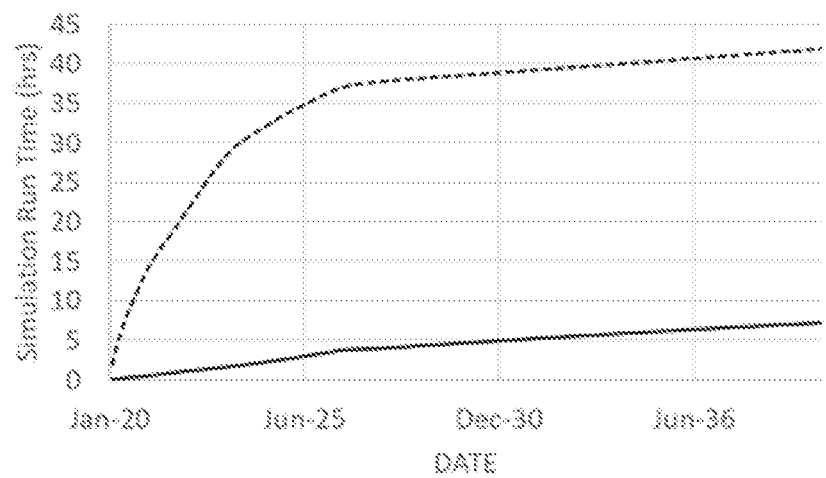

Turning to FIGS. 6A, 6B, and 6C, FIGS. 6A, 6B, 6C provide examples of various simulations using different nonlinear solvers in accordance with one or more embodiments. The following example is for explanatory purposes only and not intended to limit the scope of the disclosed technology.

Turning to FIG. 6A, FIG. 6A shows a comparison of a normalized oil rate using a Newton-Raphson method (i.e., a dashed line) and an example two-step nonlinear solver (i.e., the solid line) for an example well. In this case, the well fails to converge using the Newton-Raphson method at a maximum allowed iteration of 150 iterations. Thus, the simulation solution of the oil rate fails to converge and is thus unreliable, e.g., many oscillations are illustrated in FIG. 6A for the Newton-Raphson method. In contrast, the converged simulation solution using a two-step nonlinear solver is a much smoother process with few oscillations necessary to achieve convergence.

Turning to FIG. 6B, FIG. 6B shows a comparison of overall field oil rates. Again, the dashed line is for a Newton-Raphson method and a solid line is for a two-step nonlinear solver. As shown in FIG. 6B, the overall field performance is impacted by the convergence rate of a complex well's simulation solutions. Here, the decrease of the plateau is delayed by half a year of simulation time with the non-converged solution from the Newton-Raphson method. This difference may affect the reliability of a prediction using the simulation results.

Turning to FIG. 6C, FIG. 6C shows a simulation run time that is much enhanced using a two-level nonlinear solver. FIG. 6C shows a comparison of overall simulation run time using a Newton-Raphson method and a two-level nonlinear solver in a complex wellbore model. In this example, the simulation run time using the two-level nonlinear solver is 7 hours for a 20 year prediction period compared. In contrast, the simulation run time using the Newton-Raphson method is 42 hours. As such, the simulation speed-up factor is an increase of 6 times.

Figure 7:
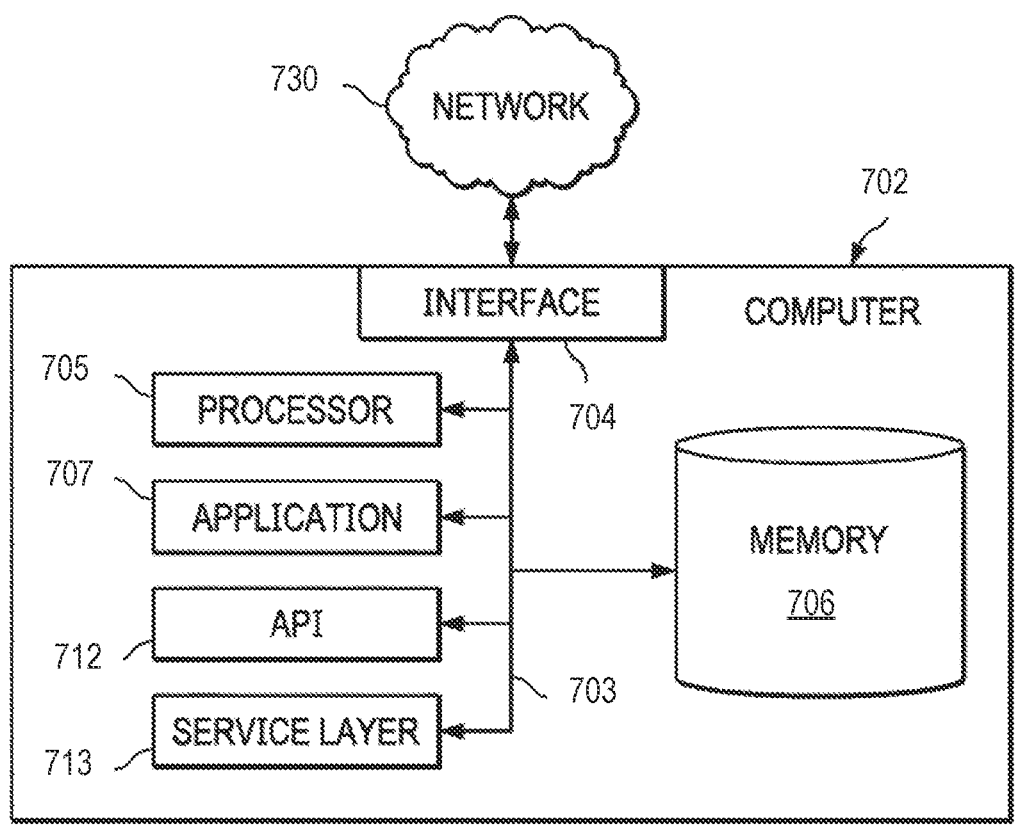
FIG. 7 shows a computer system in accordance with one or more embodiments.

Embodiments may be implemented on a computer system. FIG. 7 is a block diagram of a computer system (702) used to provide computational functionalities associated with described algorithms, methods, functions, processes, flows, and procedures as described in the instant disclosure, according to an implementation. The illustrated computer (702) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (702) may include a computer that includes an input device, such as a keypad, keyboard, touch screen, or other device that can accept user information, and an output device that conveys information associated with the operation of the computer (702), including digital data, visual, or audio information (or a combination of information), or a GUI.

The computer (702) can serve in a role as a client, network component, a server, a database or other persistency, or any other component (or a combination of roles) of a computer system for performing the subject matter described in the instant disclosure. The illustrated computer (702) is communicably coupled with a network (730). In some implementations, one or more components of the computer (702) may be configured to operate within environments, including cloud-computing-based, local, global, or other environment (or a combination of environments).

At a high level, the computer (702) is an electronic computing device operable to receive, transmit, process, store, or manage data and information associated with the described subject matter. According to some implementations, the computer (702) may also include or be communicably coupled with an application server, e-mail server, web server, caching server, streaming data server, business intelligence (BI) server, or other server (or a combination of servers).

The computer (702) can receive requests over network (730) from a client application (for example, executing on another computer (702)) and responding to the received requests by processing the said requests in an appropriate software application. In addition, requests may also be sent to the computer (702) from internal users (for example, from a command console or by other appropriate access method), external or third-parties, other automated applications, as well as any other appropriate entities, individuals, systems, or computers.

Each of the components of the computer (702) can communicate using a system bus (703). In some implementations, any or all of the components of the computer (702), both hardware or software (or a combination of hardware and software), may interface with each other or the interface (704) (or a combination of both) over the system bus (703) using an application programming interface (API) (712) or a service layer (713) (or a combination of the API (712) and service layer (713). The API (712) may include specifications for routines, data structures, and object classes. The API (712) may be either computer-language independent or dependent and refer to a complete interface, a single function, or even a set of APIs. The service layer (713) provides software services to the computer (702) or other components (whether or not illustrated) that are communicably coupled to the computer (702). The functionality of the computer (702) may be accessible for all service consumers using this service layer. Software services, such as those provided by the service layer (713), provide reusable, defined business functionalities through a defined interface. For example, the interface may be software written in JAVA, C++, or other suitable language providing data in extensible markup language (XML) format or other suitable format. While illustrated as an integrated component of the computer (702), alternative implementations may illustrate the API (712) or the service layer (713) as stand-alone components in relation to other components of the computer (702) or other components (whether or not illustrated) that are communicably coupled to the computer (702). Moreover, any or all parts of the API (712) or the service layer (713) may be implemented as child or sub-modules of another software module, enterprise application, or hardware module without departing from the scope of this disclosure.

The computer (702) includes an interface (704). Although illustrated as a single interface (704) in FIG. 7, two or more interfaces (704) may be used according to particular needs, desires, or particular implementations of the computer (702). The interface (704) is used by the computer (702) for communicating with other systems in a distributed environment that are connected to the network (730). Generally, the interface (704 includes logic encoded in software or hardware (or a combination of software and hardware) and operable to communicate with the network (730). More specifically, the interface (704) may include software supporting one or more communication protocols associated with communications such that the network (730) or interface's hardware is operable to communicate physical signals within and outside of the illustrated computer (702).

The computer (702) includes at least one computer processor (705). Although illustrated as a single computer processor (705) in FIG. 7, two or more processors may be used according to particular needs, desires, or particular implementations of the computer (702). Generally, the computer processor (705) executes instructions and manipulates data to perform the operations of the computer (702) and any algorithms, methods, functions, processes, flows, and procedures as described in the instant disclosure.

The computer (702) also includes a memory (706) that holds data for the computer (702) or other components (or a combination of both) that can be connected to the network (730). For example, memory (706) can be a database storing data consistent with this disclosure. Although illustrated as a single memory (706) in FIG. 7, two or more memories may be used according to particular needs, desires, or particular implementations of the computer (702) and the described functionality. While memory (706) is illustrated as an integral component of the computer (702), in alternative implementations, memory (706) can be external to the computer (702).

The application (707) is an algorithmic software engine providing functionality according to particular needs, desires, or particular implementations of the computer (702), particularly with respect to functionality described in this disclosure. For example, application (707) can serve as one or more components, modules, applications, etc. Further, although illustrated as a single application (707), the application (707) may be implemented as multiple applications (707) on the computer (702). In addition, although illustrated as integral to the computer (702), in alternative implementations, the application (707) can be external to the computer (702).

There may be any number of computers (702) associated with, or external to, a computer system containing computer (702), each computer (702) communicating over network (730). Further, the term "client," "user," and other appropriate terminology may be used interchangeably as appropriate without departing from the scope of this disclosure. Moreover, this disclosure contemplates that many users may use one computer (702), or that one user may use multiple computers (702).

In some embodiments, the computer (702) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, a cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method, comprising:
   obtaining wellbore pressure data from a plurality of pressure sensors in a wellbore for a first well in a geological region of interest;
   obtaining flow rate data from at least one flow rate sensor that measures a production rate for the first well;
   obtaining, by a computer processor, grid model data for the geological region of interest and well data for a plurality of wells in the geological region of interest, wherein the first well is among the plurality of wells;
   determining, by the computer processor, a simulated well network for the first well in the geological region of interest for a reservoir simulation,
      wherein the simulated well network comprises a well source node, a plurality of wellbore links, and a plurality of reservoir perforation links, and
      wherein at least one reservoir perforation link among the plurality of reservoir perforation links corresponds to a perforation operation that perforates a casing in the wellbore for the first well;
   determining, by the computer processor and based on the grid model data, the wellbore pressure data, the flow rate data, and the well data, a first simulation solution for a first constraint rate equation decoupled from the simulated well network and using a first search method;
   determining, by the computer processor and based on the grid model data, the well data, the wellbore pressure data, the flow rate data, and the first simulation solution, a second simulation solution for a second constraint rate equation coupled to the simulated well network and using a second search method;
   performing, by the computer processor and based on the grid model data, and the second simulation solution, the reservoir simulation of the geological region of interest for a predetermined period of time using a third search method; and determining, by the computer processor, a predicted production rate for the first well based on the reservoir simulation.

2. The method of claim 1, further comprising:

updating, iteratively using the second search method, a first value of the second simulation solution to produce a second value of the second simulation solution, determining whether the second simulation solution has converged based on a comparison between the first value and the second value, and wherein, in response to the second simulation solution converging, the reservoir simulation of the geological region of interest is performed using a final value of the second simulation solution.

3. The method of claim 1, wherein the first search method is a secant method, wherein the second search method is a first Newton-Raphson method, and wherein the third search method is a second Newton-Raphson method.

4. The method of claim 1, wherein the first constraint rate equation is a fixed equation that comprises a boundary condition with a constant predetermined surface flow rate.

5. The method of claim 1, further comprising:

determining, using a linear solver, a plurality of fluid properties regarding the simulated well network, wherein the plurality of fluid properties comprise at least one density value, at least one viscosity value, at least one phase volume value, and at least one pressure drop value, and wherein determining the first simulation solution comprises using the at least one viscosity value, the at least one phase volume value, and the at least one pressure drop value.

6. The method of claim 1, wherein first simulation solution for the first constraint rate equation is updated until a value of the first simulation solution satisfies a predetermined criterion, and wherein the predetermined criterion corresponds to a predetermined minimum amount of change between updates of the value of the first simulation solution.

7. The method of claim 1, wherein the reservoir simulation of the geological region of interest is performed by coupling the second simulation solution to a grid model network using implicit coupling.

8. A system, comprising:

a plurality of wells in a geological region of interest, wherein the plurality of wells comprises a first well;

a plurality of pressure sensors in a wellbore for the first well in the geological region of interest;

at least one flow rate sensor that measures a production rate for the first well; and a reservoir simulator comprising a computer processor and coupled to the plurality of wells, wherein the reservoir simulator is configured to perform a method comprising:

obtaining wellbore pressure data from the plurality of pressure sensors;

obtaining flow rate data from the at least one flow rate sensor;

obtaining grid model data for the geological region of interest;

obtaining, from the plurality of wells, well data determining a simulated well network for the first well in the geological region of interest for a reservoir simulation, wherein the simulated well network comprises a well source node, a plurality of wellbore links, and a plurality of reservoir perforation links, and wherein at least one reservoir perforation link among the plurality of reservoir perforation links corresponds to a perforation operation that perforates a casing in the wellbore for the first well;

determining, based on the grid model data, the wellbore pressure data, the flow rate data, and the well data, a first simulation solution for a first constraint rate equation decoupled from the simulated well network and using a first search method;

determining, based on the grid model data, the well data, the wellbore pressure data, the flow rate data, and the first simulation solution, a second simulation solution for a second constraint rate equation coupled to the simulated well network and using a second search method;

performing, based on the grid model data and the second simulation solution, the reservoir simulation of the geological region of interest for a predetermined period of time using a third search method; and determining a predicted production rate for the first well based on the reservoir simulation.

9. The system of claim 8, wherein the reservoir simulator further comprises functionality for:

updating, iteratively using the second search method, a first value of the second simulation solution to produce a second value of the second simulation solution, determining whether the second simulation solution has converged based on a comparison between the first value and the second value, and wherein, in response to the second simulation solution converging, the reservoir simulation of the geological region of interest is performed using a final value of the second simulation solution.

10. The system of claim 8, wherein the reservoir simulator further comprises functionality for:

determining, using a linear solver, a plurality of fluid properties regarding the simulated well network, wherein the plurality of fluid properties comprise at least one density value, at least one viscosity value, at least one phase volume value, and at least one pressure drop value, and wherein determining the first simulation solution comprises using the at least one viscosity value, the at least one phase volume value, and the at least one pressure drop value.

11. The system of claim 8, wherein first simulation solution for the first constraint rate equation is updated until a value of the first simulation solution satisfies a predetermined criterion, and wherein the predetermined criterion corresponds to a predetermined minimum amount of change between updates of the value of the first simulation solution.

12. The system of claim 8,
wherein the reservoir simulation of the geological region of interest is performed by coupling the second simulation solution to a grid model network using implicit coupling.

13. A non-transitory computer readable medium storing instructions executable by a computer processor, the instructions being configured to perform a method comprising:
obtaining wellbore pressure data from a plurality of pressure sensors in a wellbore for a first well in a geological region of interest;
obtaining flow rate data from at least one flow rate sensor that measures a production rate for the first well;
obtaining grid model data for flail the geological region of interest and well data for a plurality of wells in the geological region of interest,
wherein the first well among the plurality of wells;
determining a simulated well network for the first well in the geological region of interest for a reservoir simulation,
wherein the simulated well network comprises a well source node, a plurality of wellbore links, and a plurality of reservoir perforation links, and
wherein at least one reservoir perforation link among the plurality of reservoir perforation links corresponds to a perforation operation that perforates a casing in the wellbore for the first well;
determining, based on the grid model data, the wellbore pressure data, the flow rate data, and the well data, a first simulation solution for a first constraint rate equation decoupled from the simulated well network and using a first search method;
determining, based on the grid model data, the well data, the wellbore pressure data, the flow rate data, and the first simulation solution, a second simulation solution for a second constraint rate equation coupled to the simulated well network and using a second search method;
performing, based on the grid model data and the second simulation solution, the reservoir simulation of the geological region of interest for a predetermined period of time using a third search method; and
determining a predicted production rate for the first well based on the reservoir simulation.

14. The non-transitory computer readable medium of claim 13, wherein the instructions further comprise functionality for:
updating, iteratively using the second search method, a first value of the second simulation solution to produce a second value of the second simulation solution,
determining whether the second simulation solution has converged based on a comparison between the first value and the second value, and
wherein, in response to the second simulation solution converging, the reservoir simulation of the geological region of interest is performed using a final value of the second simulation solution.

15. The non-transitory computer readable medium of claim 13,
wherein the first search method is a secant method,
wherein the second search method is a first Newton-Raphson method, and
wherein the third search method is a second Newton-Raphson method.

16. The non-transitory computer readable medium of claim 13,
wherein the first constraint rate equation is a fixed equation that comprises a boundary condition with a constant predetermined surface flow rate.

* * * * *